(12) United States Patent
des Garennes et al.

(10) Patent No.: US 9,796,639 B2
(45) Date of Patent: Oct. 24, 2017

(54) POLYMER MIXING TECHNIQUE

(71) Applicant: DRYJECT, INC., Hatboro, PA (US)

(72) Inventors: Chris des Garennes, Elkton, MD (US); Peter van Drumpt, Wilmington, NC (US); John Paddock, Hainesport, NJ (US)

(73) Assignee: Dryject Inc. Acquisition Corp., Hatboro, PA (US)

( * ) Notice: Subject to any disclaimer, the term of this patent is extended or adjusted under 35 U.S.C. 154(b) by 89 days.

(21) Appl. No.: 14/997,114

(22) Filed: Jan. 15, 2016

(65) Prior Publication Data

US 2016/0130192 A1 May 12, 2016

Related U.S. Application Data

(63) Continuation-in-part of application No. 14/605,261, filed on Jan. 26, 2015.

(60) Provisional application No. 62/103,827, filed on Jan. 15, 2015, provisional application No. 61/931,448, filed on Jan. 24, 2014.

(51) Int. Cl.
*C05G 3/00* (2006.01)
*C05G 3/06* (2006.01)
*A01C 23/04* (2006.01)
*C05G 3/04* (2006.01)
*A01C 23/02* (2006.01)
*A01M 17/00* (2006.01)

(52) U.S. Cl.
CPC .............. *C05G 3/04* (2013.01); *A01C 23/028* (2013.01); *A01C 23/042* (2013.01); *A01M 17/002* (2013.01); *C05G 3/0011* (2013.01); *C05G 3/0064* (2013.01)

(58) Field of Classification Search
CPC ........... A01C 1/06; A01C 15/00; A01C 21/00; A01C 23/00; A01C 23/028; A01C 23/047; C05G 3/0064; C05G 3/0076
USPC ....................................................... 111/118
See application file for complete search history.

(56) References Cited

U.S. PATENT DOCUMENTS

| | | |
|---|---|---|
| 3,935,971 A | 2/1976 | Papoff et al. |
| 4,530,463 A | 7/1985 | Hinikier et al. |
| 4,658,738 A | 4/1987 | Zinck |
| 4,714,196 A | 12/1987 | McEachern et al. |
| 4,779,031 A | 10/1988 | Arends et al. |
| 4,805,088 A | 2/1989 | Cross et al. |
| 4,965,446 A | 10/1990 | Tyse |
| 4,967,957 A | 11/1990 | Bachman |
| 4,983,390 A | 1/1991 | Levy |
| 5,221,313 A | 6/1993 | Mortvedt et al. |
| 5,279,556 A * | 1/1994 | Goi .......................... G01D 5/36 128/DIG. 13 |

(Continued)

*Primary Examiner* — John G Weiss
(74) *Attorney, Agent, or Firm* — Volpe and Koenig, P.C.

(57) ABSTRACT

A cross-linked, water absorbent polymer is mixed with desirable additives and coated to prevent water absorption to create a blend that is added to water injection systems for turf and soil maintenance. The coating is rinsed off the water absorbent polymer resulting in expansion of the polymer into a gel-like substance. The water absorbent polymer has the ability to retain water and nutrients in the soil preventing nutrient runoff and reducing watering frequency. Injection of the water absorbent polymer directly into soil reduces waste and reduces hazard caused by slippery material left on soil surfaces. The method and system for mixing and injection into soil is disclosed.

20 Claims, 5 Drawing Sheets

(56) References Cited

U.S. PATENT DOCUMENTS

| | | | |
|---|---|---|---|
| 5,487,346 A * | 1/1996 | Taylor | A01C 23/028 |
| | | | 111/127 |
| 5,605,105 A | 2/1997 | Clark et al. | |
| 5,741,090 A * | 4/1998 | Dunning | A01C 23/028 |
| | | | 111/127 |
| 5,799,688 A | 9/1998 | Yie | |
| 6,358,295 B1 | 3/2002 | Tabei et al. | |
| 6,698,367 B1 | 3/2004 | Decouzon | |
| 6,749,128 B1 | 6/2004 | Oosterman | |
| 7,581,684 B2 | 9/2009 | Des Garennes et al. | |
| 8,352,130 B2 | 1/2013 | Mitchell | |
| 8,658,254 B2 * | 2/2014 | Delis | C08J 3/03 |
| | | | 427/387 |
| 9,078,393 B1 * | 7/2015 | Polizotto | A01C 21/005 |
| 2001/0008635 A1 * | 7/2001 | Quellet | A23L 2/56 |
| | | | 424/408 |
| 2003/0131528 A1 | 7/2003 | Vonk et al. | |
| 2005/0284348 A1 | 12/2005 | Garennes et al. | |
| 2006/0260372 A1 | 11/2006 | Liu et al. | |
| 2010/0175316 A1 | 7/2010 | Kubacak | |
| 2012/0168532 A1 | 7/2012 | Giles | |
| 2013/0195946 A1 | 8/2013 | Stamper et al. | |
| 2014/0216311 A1 * | 8/2014 | De Lany | A01C 23/026 |
| | | | 111/118 |
| 2015/0257383 A1 * | 9/2015 | Deisenroth | A01N 37/12 |
| | | | 504/100 |
| 2016/0083309 A1 * | 3/2016 | Pina | C05B 17/00 |
| | | | 71/11 |
| 2016/0324149 A1 * | 11/2016 | Sanders | A01N 43/90 |

\* cited by examiner

POLYMER MIXING TECHNIQUE

CROSS REFERENCE TO RELATED APPLICATIONS

This application claims the benefit of U.S. Patent Application No. 62/103,827 filed on Jan. 15, 2015 which is incorporated by reference as if fully set forth, and this application is a continuation-in-part of U.S. patent application Ser. No. 14/605,261, filed Jan. 26, 2015, which claims the benefit of U.S. Patent Application No. 61/931,448 filed on Jan. 24, 2014, which applications are incorporated by reference as if fully set forth.

FIELD OF INVENTION

This application generally relates to the field of turf maintenance, ornamental horticulture, nursery growers, agriculture and more specifically, to the application of liquid polymer additives with precision and thorough distribution to a targeted area in soil without disruption or disturbance to the ground surface.

BACKGROUND

Turf and soil maintenance, for those involved in the golfing industry ornamental horticulture, nursery growers, agriculture and turf grass management, plays a critical role in the success of a business. The greens and fairways provide the surface where golfers spend the majority of their time. Proper treatment and maintenance of that surface creates a higher quality product, and provides for a more aesthetically appealing landscape, which creates a highly attractive and desirable course for play.

The introduction of various materials, such as soil amendments, fertilizers, insecticides, and aeration improves the properties of the soil and the growth it supports. Conventionally, farmers and turf maintenance people have, for the most part, incorporated substances such as fertilizers, insecticides and polymers into the soil using tillage tools that mechanically cut through the ground and release the additive products at a point below the top surface of the ground. Surface treatment may also be carried out by either spraying liquid chemicals onto the top surface of the ground or spreading dry materials on the surface without making efforts to incorporate them deeper into the soil. However, top surface application of chemicals results in the presence of excess material left on the surface leading to several undesirable side effects, such as a slip and fall hazard, excess moisture on the surface, wasted material, and environmental impairment due to run off and exposure to wild life.

While a significant amount of technology currently exists for placing liquid substances into the subsurface using high pressure water jets that cut through the soil and carry the substance down to the desired depth, very little successful work has been done in the application of liquid additives with precision and thorough distribution in the root zone. Accordingly, there exists a need for an additive that can be delivered precisely and thoroughly to the root zone that distributes nutrients while reducing the necessity for frequent watering and soil treatments.

SUMMARY

A cross-linked, water absorbent polymer is mixed with desirable additives and coated to prevent water absorption to create a blend that is added to water injection systems for turf and soil maintenance. The coating is rinsed off the water absorbent polymer resulting in expansion of the polymer into a gel-like substance. The water absorbent polymer has the ability to retain water and nutrients in the soil preventing nutrient runoff and reducing watering frequency. Injection of the water absorbent polymer directly into soil reduces waste and reduces hazard caused by slippery material left on soil surfaces. The method and system for mixing and injection into soil is disclosed.

A peristaltic pump injection system used in turf maintenance equipment for placing additives, such as liquid materials, into the soil at a precision depth is disclosed. Fluid jets, for example using water or air blasts, carry the materials through the peristaltic pump injection system and into the soil and leave no eruption on the surface to interfere with any immediately following activities or other treatments. This is particularly beneficial where the materials are being added to lawns, putting greens and fairways on golf courses, sports fields and the like.

The additives delivered in a blast can be used to effectively drill a hole in the soil. The hole may have a diameter in the range of 0.1 to 2.0 inches. Substantially simultaneously, the created hole may be filled with a soil additive or amendment. Once the hole has been filled, the surface of the soil is left smooth, with minimal soil disruption and displacement.

The additives are injected into the injection manifold through an upstream valve and high pressure water is injected through a poppet valve assembly, downstream of the valve where the additive materials are injected. The additives include a blended water absorbent polymer coated with an agent to retard absorption of water. The water absorbent polymer is cross-linked potassium polyacrylate. The dry size of the water absorbent polymer is approximately 200-800 microns. The agent to retard absorption of water is rinsed off the water absorbent polymer after contact with water in soil. The polymer blend comprises fertilizers. The polymer blend comprises salts The fluid/additives are injected between high pressure blasts into the injection manifold and are mixed in the injection manifold with the high pressure water. In some instances, the fluid/additives may be injected into the dosing material. This results in injected materials that are not damaged by high pressure and allows for complete defusing of the additives into the soil. This mixture is urged through tubes of the peristaltic pump assemblies, at a precision amount, to nozzles and manifolds of the device.

The device fires its nozzles as a function of the distance traveled by the device along its path of travel, e.g. as ground speed sensed over a period of time. A ground speed sensor generates a signal that is calculated as a ground speed by the central controller and used to calculate the distance traveled, or the instantaneous speed. The central controller can adjust the injector rates for the peristaltic pumps, on the go, and for systems using multiple peristaltic pumps, the pumps can be adjusted both individually and together.

Thus, until the device travels its pre-set distance, the next blast from the nozzles may not occur, regardless of whether the device travels quickly or slowly over such distance. In other words, although the spacing between holes may be adjusted by the operator, once a selection is made, that spacing from the beginning of the hole to the beginning of the next hole, remains substantially fixed.

The device may provide deep penetration of additives into the soil, as great as 10 inches in depth and be used to punch through sod. The device may also punch through fiber or stabilized sports turf to allow better root proliferation below a mesh; aerate, amend, and top-dress in one pass, and allow for play on a smooth surface in approximately one hour.

For sake of brevity, this summary does not list all aspects of the present invention, which is described in further detailed below.

BRIEF DESCRIPTION OF THE DRAWINGS

The foregoing summary, as well as the following detailed description of the preferred embodiments, will be better understood when read in conjunction with the appended drawings. For the purpose of illustrating the invention, there is shown in the drawings embodiments which are presently preferred. It should be understood, however, that the invention is not limited to the precise arrangements shown.

Figure 1A:
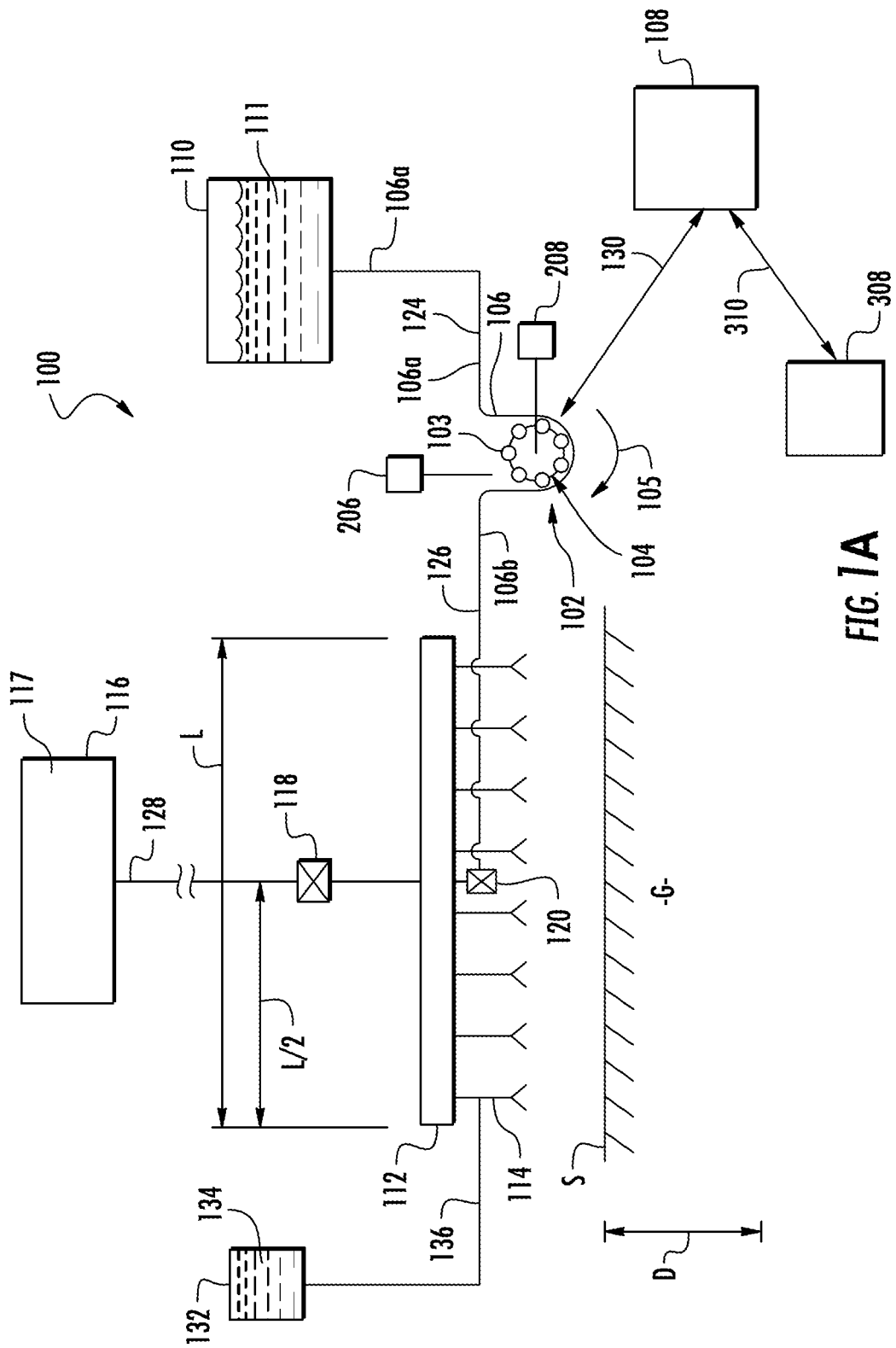
FIG. 1A is a schematic view of a system for injecting an additive into the soil in accordance with a disclosed embodiment.

To facilitate understanding, identical reference numerals have been used, where possible, to designate identical elements that are common in the figures. The figures are not drawn to scale and may be simplified for clarity. It is contemplated that elements and features of one embodiment may be beneficially incorporated in other embodiments without further recitation.

While described in reference to a system for injecting liquid additives to soil, the present invention may be modified for a variety of applications while remaining within the spirit and scope of the claimed invention, since the range of the potential applications is great, and because it is intended that the present invention be adaptable to many such variations. For example, the system could be used for application if stabilizers to a ground cover other than soil, for example asphalt or macadam.

DETAILED DESCRIPTION OF THE PREFERRED EMBODIMENTS

Certain terminology is used in the following description for convenience only and is not limiting. The words "front," "back," "forward," "backwards," "inner," and "outer" designate directions in the drawings to which reference is made. Additionally, the terms "a" and "one" are defined as including one or more of the referenced item unless specifically noted otherwise. A reference to a list of items that are cited as "at least one of a, b, or c" (where a, b, and c represent the items being listed) means any single one of the items a, b, or c, or combinations thereof. A recitation of "into the soil" or the like means to the surface of the soil as well as beneath the surface of the soil unless the context clearly indicated otherwise. The terminology includes the words specifically noted above, derivatives thereof, and words of similar import.

In an example, soil injection systems, such as those detailed in U.S. Pat. No. 5,605,105 and U.S. Pat. No. 7,581,684, both of which are incorporated herein by reference as if fully set forth, are used to inject the water absorbent polymer into the soil. This method of injecting the polymer into the soil results in thorough and precise distribution with the added benefit of little surface disruption. The high pressure water from the injection system may begin or even complete the process of washing off the protective coating from the polymer for more rapid polymer expansion into the gel-like absorbent substance in the soil.

One method and device for inserting the present polymer gel into the soil is described in detail below. Many other methods of insertion may be used including numerous off the shelf techniques for applying chemicals and products to the root zone of grass of other plants, by way of example.

FIG. 1A schematically shows an example of a system 100 for injecting a polymer into the soil including a peristaltic pump assembly 102. The peristaltic pump assembly 102 is configured for placing material on or beneath the surface S of a soil system or soil. The device delivers wet material at least to the surface S of the soil and preferably into the soil subsurface to a desired depth D. The peristaltic pump assembly 102 is generally known to include a plurality of rollers 103 supported rotation on a rotating carriage assembly 104. As the carriage 104 rotates as indicated by arrow 105 under the influence of a variable voltage motor 208 (FIGS. 1 and 2), rollers 103 successively compress a resilient tube 106 to urge a material within the tube 106 in the direction of rotation (i.e., corresponding with arrow 105). An axial face of the rotating carriage assembly 104 may include an encoder disc 202. The encoder disc 202 has features 204, for example holes 204, formed around a perimeter of the disc 202 as illustrated in FIG. 2. A sensor 206 (FIG. 1A) is positioned to read, or sense, data from the encoder disc 202, for example the number of features 204 passing in a given period of time, and provide that data to a computer control system or controller 108.

A first end 106a of the resilient tube 106 is fluidly coupled to an additive reservoir 110 containing an additive 111. The first end 106a resilient tube 106 may be directly coupled to the reservoir 110 or may have one or more intermediate fluid conduits forming inlet line 124. The additive reservoir 110 contains a liquid additive 111 that may comprise one or more miscible or immiscible liquids or one or more solids suspended in one or more liquids, as in a slurry, or other fluid compositions, such as a gel, suitable for pumping via a peristaltic pump.

Figure 1B:
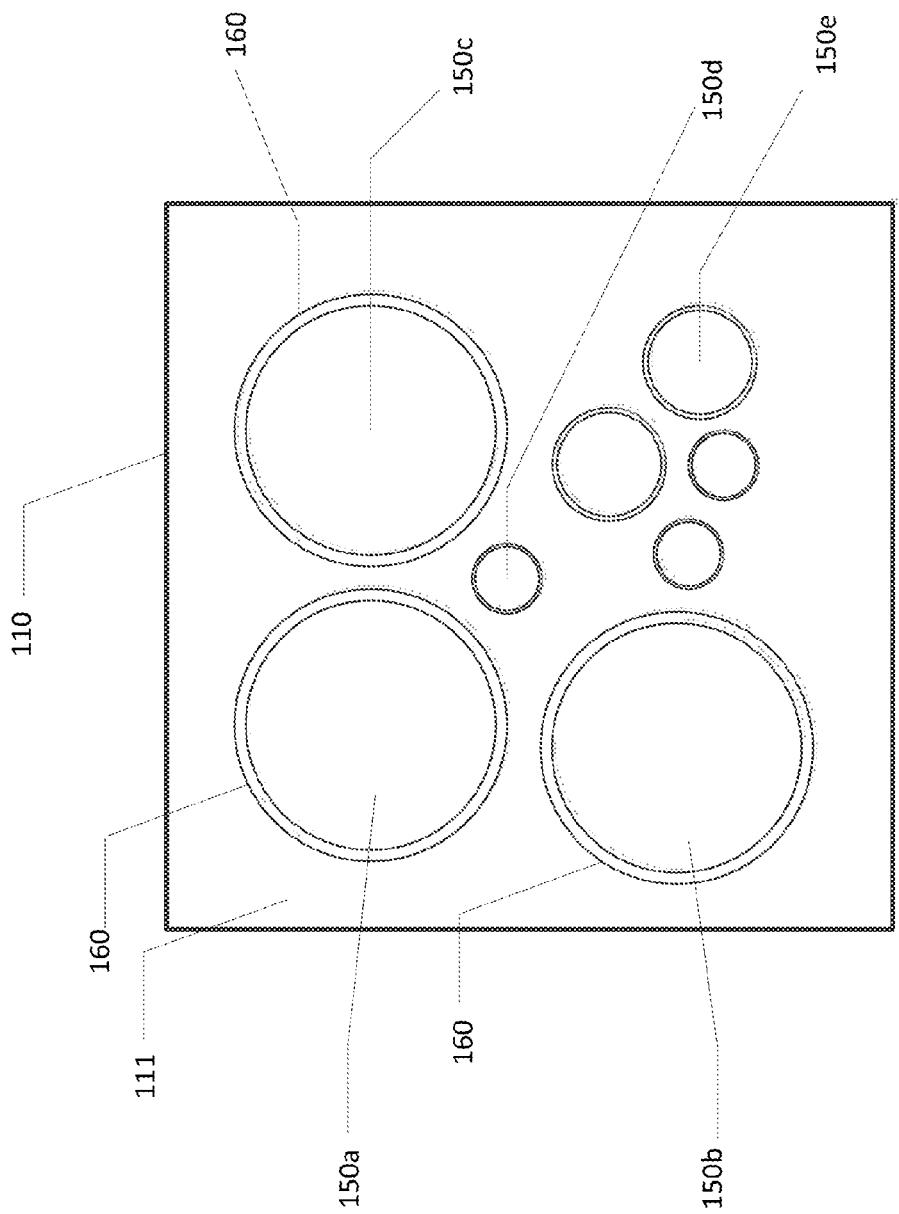
FIG. 1B is a diagrammatic view of the reservoir of FIG. 1A including an additive with a polymer.
Figure 2:
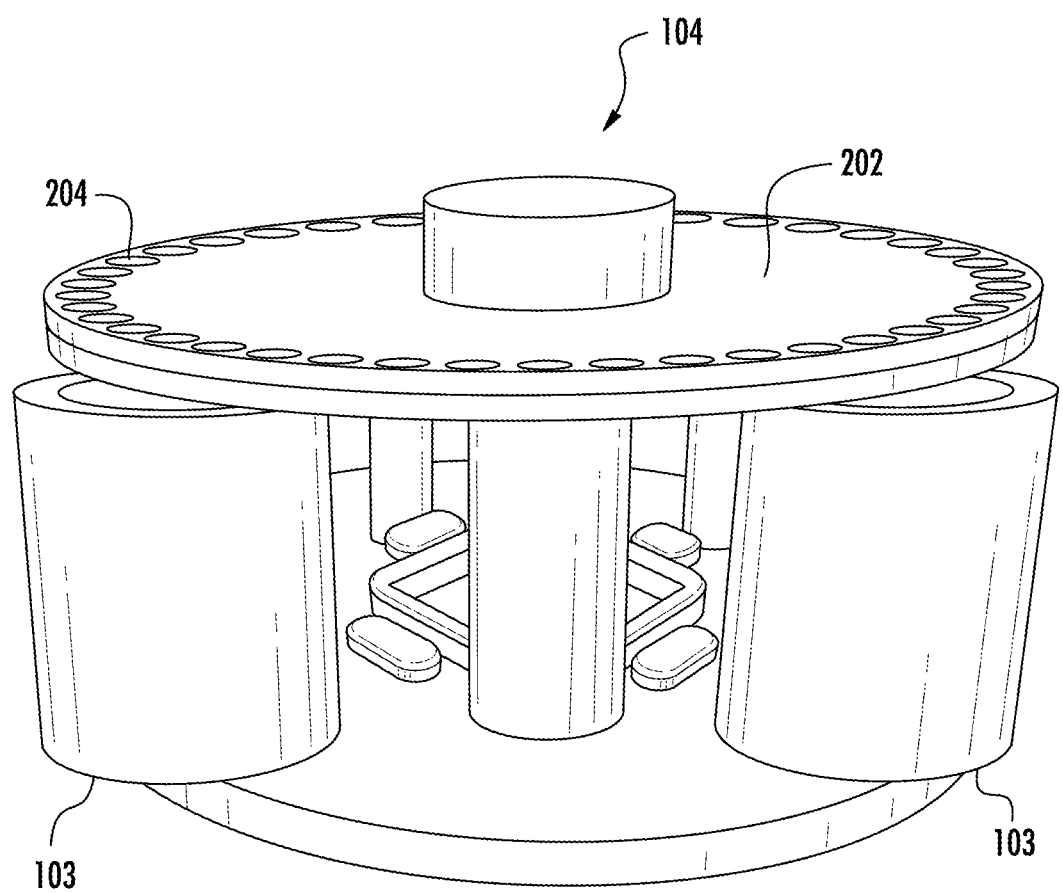
FIG. 2 is a perspective view of a rotating carriage with an encoder disc in accordance with a disclosed embodiment.

Referring now additionally to FIG. 1B. FIG. 1B is a diagrammatic view of the reservoir 110 of FIG. 1A including an additive 111 with a polymer 150. Additive 111 may include a polymer 150.

Polymer 150 may include cross-linked polymers 150a, 150b, 150c, 150d, 150e and food grade emulsifiers, stabilizers, preservatives, and growth enhancers. Polymer 150 may be formulated into a liquid flowable form with a blend of agents 160 to short-term retard the expansion of polymer 150. A cross-link is a bond that links one polymer chain to another. The polymer chain may be linked via covalent bonds or ionic bonds. Polymer 150 may be a synthetic polymer or natural polymer, such as a protein, for example. Generally, cross-linking promotes a difference in the polymers' physical properties.

Once in the soil, the expansion of polymer 150 may be retarded until coating 160 is completely washed off as a result of precipitation or irrigation. The expanded polymer 150 may reduce watering frequency by increasing moisture infiltration rates and the capacity of the soil to retain water. This in turn decreases water runoff due to the hydrophilic nature of polymer 150. The presence of the water absorbent polymer 150 helps to moderate soil temperature and makes aeration more effective. Yet another benefit of the disclosed polymer 150 is a greener, fuller top growth and higher crop yields and water savings when the polymer 150 is used in farm soil.

An embodiment may provide a method for injection of polymer 150 directly into the soil at the root zone as described herein. This method results in excellent distribution of nutrients, prevents disruption of turf surface, and eliminates excess material from turf surface. The direct injection of the water absorbent polymer 150 directly into the soil profile also has the advantage of improving root growth and viability.

In one embodiment of the disclosure, polymer 150 includes a coating 160 that is a vegetable oil to prevent polymer 150 from absorbing and expanding prior to injection in soil. Polymer 150 may contain additives, such as fertilizers, which help to retain nutrients in the soil profile thereby reducing nutrient leaching.

A blend of agents 160 will retard the expansion of a water absorbent polymer 150 until after polymer 150 has been delivered to the target area in soil. For example, polymer 150 may be a cross-linked potassium polyacrylate polymer that is blended with the desired additives, such as food grade emulsifiers, stabilizers, preservatives and growth enhancers. Polymer 150 may be coated, such as with vegetable oil and proprietary formula which forms a protective coating 160 that retards the ability of polymer 150 to absorb water, thus delaying expansion of polymer 150 into a gel-like substance. The coated polymer 150 may be formulated into a liquid for injection into soil as set forth herein. Once polymer 150 has been injected into the soil, the protective coating 160 may be washed off either by the process of placing polymer 150 into the soil, after some precipitation or irrigation or a combination thereof, enabling polymer 150 to absorb water and swell to full capacity in the root zone.

In an embodiment, larger particle sizes 150a may be used to decrease the rate of degradation of the particles 150a, 150b, 150c, 150d, 150e and prevent consumption by microbes, which consume or otherwise breakdown smaller polymer particles 150e more quickly.

In an embodiment, the dry polymer 150 particles are 200-800 microns in size to reduce degradation rates. A larger particle 150a size is also desirable because larger particles may absorb more water, resulting in greater and longer lasting benefit to the soil. Microbes present in the soil consume the particles 150 and do so more quickly with the smaller particles 150e reducing the benefit to the soil. Accordingly, the larger particle size 150a may provide a benefit to compensate for microbial activity and extend particle presence in soil.

A second end 106b of the resilient tube 106 is fluidly coupled to the manifold 112 either directly or through one or more intermediate fluid conduits forming outlet line 126. A check valve 120 is placed in the outlet line 126 between the peristaltic pump 102 and the manifold 112. The check valve 120 is configured to allow flow from the peristaltic pump 102 to the manifold 112 but to prevent or block flow from the manifold to the peristaltic pump 102. The peristaltic pump is controlled to constantly provide an amount of additive to the manifold 112, except for during an injection, discussed below. As the additive 111 flows into the manifold 112, the pressure within the manifold is at or near atmospheric pressure (i.e., 0 pounds per square inch gage) allowing a free flow of the additive. In an example as illustrated, the second end 106b of the resilient tube 106 is coupled with the manifold at a midpoint L/2 of the length L of the manifold via outlet line 126.

The manifold 112 includes a plurality of nozzles 114. In the non-limiting embodiment illustrated schematically in FIG. 1A, eight nozzles 114 are shown evenly spaced along the length L, although spacing need not be even. In other embodiments, a greater or lesser number of nozzles 114 may be used with even or uneven spacing. The nozzles 114 are in direct fluid communication with the interior of the manifold 112 as illustrated. In an example, one or more nozzles 114 may have a valved connection with the manifold 112.

A source of pressurized fluid 116 is in fluid communication with the manifold 112 via pressure line 128. In an example, the point of attachment between the manifold 112 and the source of pressurized fluid 116 is at a midpoint L/2 of the length L of the manifold 112 via pressure line 128. In an example, the source of pressurized fluid 116 is attached to the manifold 112 adjacent to the second end of the resilient tube 106.

The source of pressurized fluid 116 may be an accumulator or other device or structure configured to supply a fluid 117 at a substantially constant pressure. As used herein, a pressurized fluid 117 is a fluid at a pressure greater than the surrounding atmospheric pressure. This pressure is sometimes referred to a gage pressure to distinguish it from the total, or absolute, pressure which includes atmospheric pressure. In some embodiments, the pressurized fluid 117 may be at a pressure of up to 4,000 pounds per square inch, for example the pressure of the pressurized fluid 117 may range from about 2,000 pounds per square inch to about 4,000 pounds per square inch.

A valve, for example a poppet valve 118, is placed in the pressure line 128 between the source of pressurized fluid 116 and the manifold 112, preferably adjacent to the manifold 112. The poppet valve 118 is configured to provide a blast or a jet of pressurized fluid 117 to the manifold. Advantageously, the blast or jet of pressurized fluid 117 interacts with the additive 111 delivered to the manifold by the second end of the resilient tube 106b. The interaction of the pressurized fluid 117 and the additive 111 in the manifold evenly, or substantially evenly disperses the additive 111 in the pressurized fluid 117.

The (gage) pressure within the manifold 112 varies from atmospheric pressure to approximately the pressure of the pressurized fluid source 116. Accordingly, a check valve is not included, as the contents of the manifold will not flow in the direction of the pressurized fluid source 116. However, a check valve may be placed in the pressure line to insure the contents of the manifold do not enter the high pressure source 116.

In an example, a hopper 132 containing a dry filler material 134 may be coupled via line 136 to the nozzles 114 (only shown connected to one nozzle 114 in FIG. 1A for clarity). As the injected material travels through the nozzles 114, the velocity of flow causes a vacuum in the nozzles 114 behind the flow. This vacuum can be used to draw the dry material 134 into the nozzle 114 and flow into any void caused in the soil surface S A sensor 308 may be attached to a wheel 306, either free-wheel or drive wheel, for selectively sensing data corresponding to ground speed. In an example, the data relates to angular displacement corresponding to rotations of a wheel 306 of a known diameter. Between the sensor 308 and the controller 108 is a communication link 310 to facilitate communication of ground speed data between the sensor 308 and the controller 108.

Figure 3:
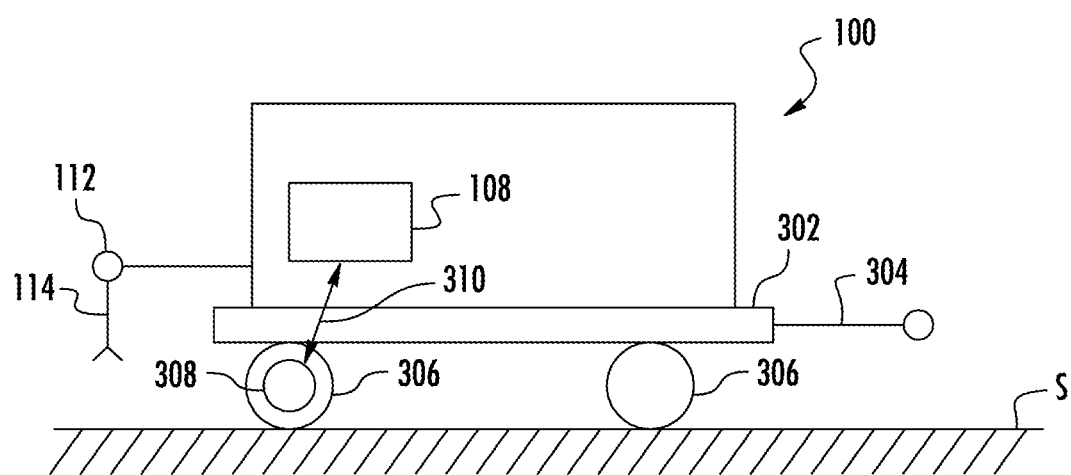
FIG. 3 is a schematic side view of the system of FIG. 1A on a movable platform in accordance with a disclosed embodiment.

In the non-limiting embodiment illustrated in FIG. 3, the entire system 100 is supported on the platform 302 for ease of illustration only. Some components may be supported for movement over the surface S in a separate vehicle. The communication link 310 may be a wired link, or may be a wireless link connection.

When the output motor 208 rotates the carriage assembly 104, rollers 103 compress the resilient tube 106 within a cavity peristaltic pump 102 to draw the additive 111 from the additive reservoir 110 through the first end portion 106a and force the additive 111 through the second end 106b of the resilient tube. In an example, the he carriage assembly 104 can rotate in a clockwise (as illustrated) or counter-clockwise direction and additives in the resilient tube 106 can be urged within the flexible tube in the direction of travel of the rollers 103 (i.e., corresponding with arrow 105 in FIG. 1A).

The additives 111 are provided or metered out by the peristaltic pump 102 in precision amounts to the injection manifold 112. This is accomplished by mounting an encoder disc 202 on the carriage assembly 104 (FIG. 2). The encoder disc 202 may be formed from a metal, for example stainless steel, with features, such as holes 204 that are sensed by a sensor 206, for example a Hall Effect proximity sensor. As shown in FIG. 2, the sensor 206, for example a proximity sensor, is mounted to the peristaltic pump housing and detects the absence or presence of metal directly in front of it. In an example the proximity sensor 50 reads the revolutions of the encoder disc 202 per a period of time and reports the revolutions to a computer control system, controller 108 via communication link 130. The communication link 130 may be a wired link or a wireless link to facilitate transmission of at least a control signal from the controller 108 to the motor 208. As illustrated in the non-limiting embodiment of FIG. 4, each through hole 204 in the encoder disc 202 represents 1/40 of the peristaltic pump's 102 volume per 1 revolution. For example, if the peristaltic pump's 102 volume per revolution is 0.16 ounces, each hole would be equal to 0.0036 ounce. As illustrated in FIG. 1A, the computer sends a control signal, for example a variable output voltage, to the motor 208 to pump the additive material 111 at a given revolution per period of time. In other words, the controller 108 controls the amount of material that is output from the peristaltic pump 102. The desired amount of material output can be pre-set at the controller 108 and may vary from approximately 3 oz. per 1,000 sq. ft. to approximately 365 oz. per 1,000 sq. ft. The peristaltic pump 102 output is controlled by the controller 108 based on data provided by the sensor 206 and the sensor 308. The sensor 308 provides ground speed data to central controller 108.

As shown in FIG. 1A, the additives 111 of the peristaltic pump 102 are provided to the injection manifold 112 through valve, check valve 120, and high pressure fluid, for example water, is injected through a poppet valve assembly 118, adjacent to the valve 120 where the additive materials 111 of the peristaltic pump 102 are provided. When high pressure fluid (e.g., water) is injected into the injection manifold 112, the injection causes the pressure in the manifold 112 to rise. The pressure in the manifold 112 can rise to the same, or substantially the same, pressure as the pressurized fluid source 116. This increase in pressure closes the check valve 120 that allows the additive 111 to flow into the manifold. The pressure within the manifold 112 causes the fluid 117 and the additive 111, mixed under the influence of the fluid 117 jet in the manifold 112, to exit the manifold through the nozzles 114. The nozzles 114 may be in free and open fluid communication with the atmosphere as illustrated, or may include one or more valves to restrict the flow out of the manifold 112.

As the pressure drops in the manifold 112, the check valve moves into an open position and the additives 111 again enter the mixing chamber. Injection of the high pressure fluid 117 into the injection manifold 112 stops the movement of the additive into the injection manifold for duration of approximately 0.05 to 0.30 seconds. During this time period, the pressure in the mixing chamber increases from approximately 0 p.s.i. (gage, therefore corresponding to atmospheric pressure) to approximately 4,000 p.s.i. (gage). After each injection of high pressure fluid 117 into the manifold 112, the pressure in the manifold 112 decreases to approximately 0 p.s.i.; during this period, between high pressure injections, the additives move into the injection manifold 112. The mixture of additives and high pressure water is pumped into the soil as noted below.

During the period when the check valve 120 is closed and the pressure in the manifold 112 is elevated, the carriage assembly 104 of peristaltic pump 102 continues to turn as controlled by the variable voltage motor 208. The second end portion 106b of the resilient tube 106 or the outlet line 126, or both the resilient tube 106 and the outlet line 126, acts as an accumulator for the additive materials 111 pumped during that time period.

The mixture of additives 111 and high pressure fluid 117 is injected into the ground G under high pressure through nozzles 114. The velocity of the high pressure fluid 117 moving through the nozzles 114 allows the mixture to be forced into the soil profile from depths D of approximately 1 to 12 inches. Movement of the high pressure fluid 117 and mixture into the soil creates fractures in the soil. The mixture is then drawn into micro pores in the soil through capillary action.

Figure 4:
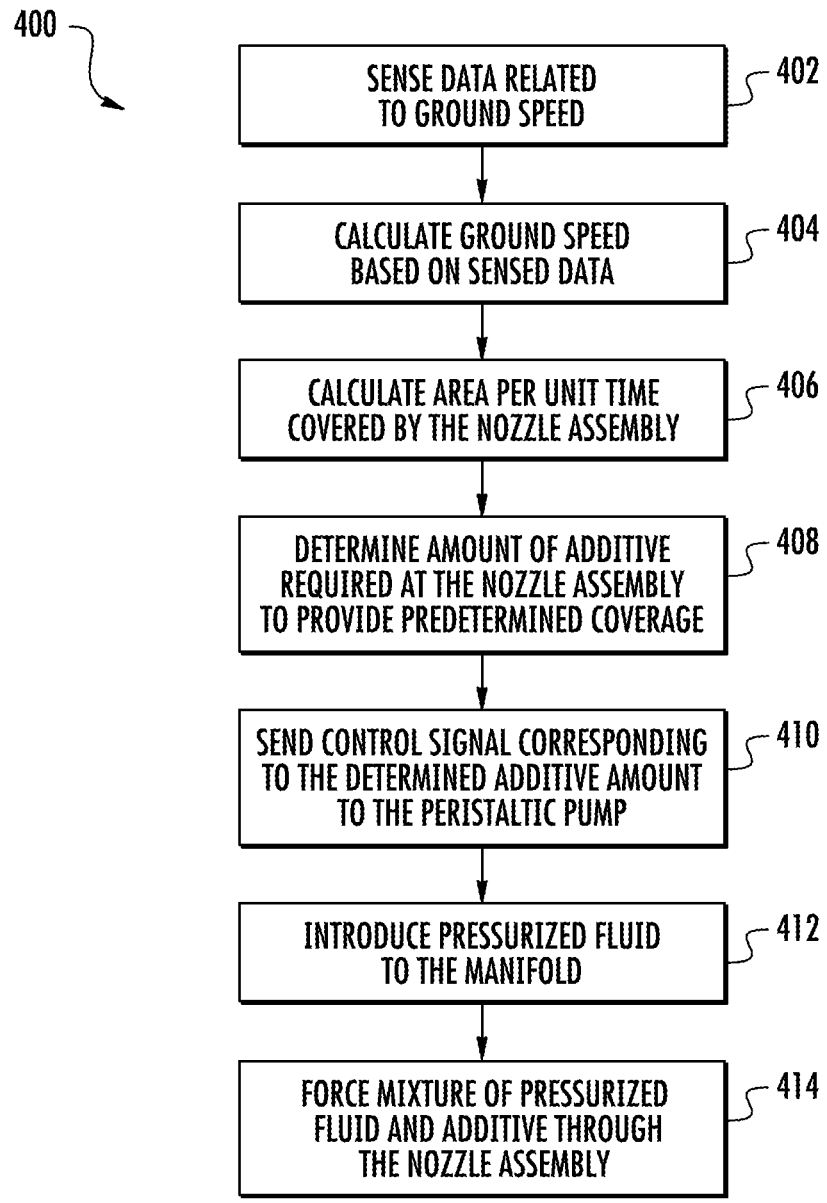
FIG. 4 is a flow diagram if a method in accordance with a disclosed embodiment.

FIG. 4 is a flow diagram representing a method 400 for injecting an additive to the soil according to a disclosed embodiment. At 402 data related to ground speed of the system 100 is sensed by a sensor, for example sensor 308, which may include an encoder disc mounted to a wheel 306 and a proximity sensor fixed to the movable platform 302. The data is communicated to the controller 108 where the data may be stored.

At 404, the ground speed of the system 100 including at least the manifold 112 and nozzles 114 is calculated at the controller 108 from the data received.

At 406, an area per unit time covered by the nozzle assembly 114 at the calculated ground speed is calculated at the controller 108.

The controller 108 determines at 408 the amount of additive 111 required at the nozzles 114 in order to apply a predetermined amount of additive per unit area to the soil.

At 410, the controller 108 provides a control signal, for example a variable voltage, via the communications link 130 to the peristaltic pump 102 to deliver the determined amount of an additive 111 to the manifold 112. Under the pressure generated by the peristaltic pump 102 in outlet line 106b, the check valve 120 is caused to open, allowing the determined amount of additive 111 to be delivered to the manifold 112.

At 412, poppet valve 118 opens and a pressurized fluid 117 is introduced to the manifold 112. As the pressurized fluid 117 enters the manifold, the check valve 120 is urged to close and the manifold become pressurized to the same, or substantially the same, pressure as the pressurized fluid 117. The pressurized fluid 117 enters the manifold 112 as a jet or a blast and distributed the additive within the manifold 112.

At 414, the pressurized manifold forces the mixture of pressurized fluid and additive through the nozzles 114 and injects the mixture of pressurized fluid and additive into the soil. The sequence can be repeated for a set number of cycles programmed into the controller 108.

Having thus described various methods, configurations, and features in detail, it is to be appreciated and will be apparent to those skilled in the art that many physical changes, only a few of which are exemplified in the detailed description above, could be made in the apparatus and method without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A method for mixing water absorbent polymer particles with additives, the method comprising:
    blending a water absorbent polymer with food grade emulsifier, stabilizers, preservatives and growth enhancers to form a polymer blend;
    coating the polymer blend with an agent to retard absorption of water; and
    formulating the coated polymer blend into a liquid.

2. The method of claim 1, wherein the water absorbent polymer is cross-linked potassium polyacrylate.

3. The method of claim 1, wherein the dry size of the water absorbent polymer is approximately 200-800 microns.

4. The method of claim 1, wherein the agent to retard absorption of water is the proprietary blend and process.

5. The method of claim 1, wherein the agent to retard absorption of water is rinsed off the water absorbent polymer after contact with water in soil.

6. The method of claim 1, wherein an uncoated polymer blend forms a gel-like substance when contacted with water.

7. The method of claim 1, wherein the polymer blend comprises fertilizers.

8. The method of claim 1, wherein the polymer blend comprises salts.

9. A method for injecting a water absorbent polymer blend into soil, the method comprising:
    blending a water absorbent polymer with food grade emulsifier, stabilizers, preservatives and growth enhancers to form a polymer blend;
    coating the polymer blend with an agent to retard absorption of water;
    formulating the coated polymer blend into a liquid additive;
    mixing the liquid additive with water; and
    injecting the water with the liquid additive into soil.

10. The method of claim 9, wherein the water with the liquid additive is injected into soil by an injection system.

11. The method of claim 9, wherein the water with the liquid additive is injected into the root zone of the soil.

12. The method of claim 9, wherein the water pressure from injection into the soil rinses the coating off of the polymer blend, causing expansion of the polymer blend into a gel-like substance when contacted with water.

13. A system for injecting a polymer additive into the soil, the system comprising:
    a manifold including a plurality of nozzles distributed along a length;
    a peristaltic pump assembly that comprises a motor that rotates a carriage assembly, an encoder disc, a sensor, an inlet line fluidly coupled to an additive reservoir, and an outlet line coupled to the manifold, the additive reservoir including a blended water absorbent polymer coated with an agent to retard absorption of water;
    a pressurized fluid source fluidly coupled to the manifold; and
    a ground speed sensor; and
    a computer control system in communication with the peristaltic pump assembly and the ground speed indicator,
    wherein the computer control system controls an output of the peristaltic pump to be proportional to the ground speed sensed.

14. A method for injecting an additive into the soil, the method comprising:
    sensing data related to ground speed of a nozzle assembly including a plurality of nozzles;
    calculating the ground speed from the data;
    determining an area per unit time covered by the nozzle assembly at the calculated ground speed;
    determining an amount of additive required by the nozzles in order to apply a predetermined amount of additive unit area to the soil, wherein the additive includes a blended water absorbent polymer coated with an agent to retard absorption of water;
    pumping an amount of an additive via a peristaltic pump and a check valve to a manifold fluidly coupled to the nozzles;
    introducing a pressurized fluid to the manifold via a poppet valve to pressurize the manifold and distribute the additive in the pressurized fluid; and
    injecting the pressurized fluid and additive into the soil through the nozzle via the pressurized manifold.

15. The method of claim 14, wherein the water absorbent polymer is cross-linked potassium polyacrylate.

16. The method of claim 14, wherein the dry size of the water absorbent polymer is approximately 200-800 microns.

17. The method of claim 14, wherein the agent to retard absorption of water is rinsed off the water absorbent polymer after contact with water in soil.

18. The method of claim 14, wherein an uncoated polymer blend forms a gel-like substance when contacted with water.

19. The method of claim 14, wherein the polymer blend comprises fertilizers.

20. The method of claim 14, wherein the polymer blend comprises salts.

* * * * *